(12) United States Patent
Liu et al.

(10) Patent No.: US 7,511,951 B2
(45) Date of Patent: Mar. 31, 2009

(54) PORTABLE COMPUTER

(75) Inventors: Zhi-Gang Liu, Shenzhen (CN); Hsuan-Chen Chen, Tu-Cheng (TW); Chien-Li Tsai, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 152 days.

(21) Appl. No.: 11/309,626

(22) Filed: Sep. 1, 2006

(65) Prior Publication Data
US 2007/0076364 A1   Apr. 5, 2007

(51) Int. Cl.
*G06F 1/16* (2006.01)
*H05K 7/16* (2006.01)

(52) U.S. Cl. ............. 361/683; 361/725; 312/223.2

(58) Field of Classification Search ............ 361/683, 361/724–727, 740, 747, 759, 801, 679–682, 361/684–686; 174/50, 535, 562, 135
See application file for complete search history.

(56) References Cited

U.S. PATENT DOCUMENTS

| | | | |
|---|---|---|---|
| 6,101,089 A * | 8/2000 | Seto et al. ............... | 361/687 |
| 6,128,192 A * | 10/2000 | Howell et al. ............ | 361/724 |
| 6,222,726 B1 * | 4/2001 | Cha ....................... | 361/683 |
| 6,718,408 B2 | 4/2004 | Esterberg et al. | |
| 6,842,333 B2 | 1/2005 | Lee et al. | |
| 6,914,773 B2 | 7/2005 | Yang et al. | |
| 2003/0184961 A1 | 10/2003 | Ahn | |
| 2006/0023406 A1 * | 2/2006 | Shih et al. ............... | 361/683 |

* cited by examiner

*Primary Examiner*—Jayprakash N Gandhi
*Assistant Examiner*—Nidhi Desai
(74) *Attorney, Agent, or Firm*—Wei Te Chung

(57) ABSTRACT

A portable computer includes a chassis, a top panel, a motherboard, and a side cover. The chassis includes a bottom panel and a side panel. The bottom panel forms a pair of restricting tabs. The top panel covers the chassis. The top panel includes a plurality of resilient tabs. The motherboard is received in the chassis. The motherboard forms a plurality of sockets. The side cover is replaceably mounted between the chassis and the top panel, being held by the restricting tabs, the resilient tabs, and side panel. The side cover defines a plurality of slots for receiving the sockets of the motherboard.

17 Claims, 4 Drawing Sheets

PORTABLE COMPUTER

FIELD OF THE INVENTION

The present invention relates to portable computers, and more particularly to a portable computer which includes a side cover that can be replaced expediently.

DESCRIPTION OF RELATED ART

Portable computers, such as laptop computers and notebook computers, have become increasingly popular for general use. One vital factor contributing to the increasing popularity of the portable computers is its decreasing size and weight. In order to meet the demands of consumers in performance and uses of portable computers, upgrading and updating of portable computers is very quickly. Because inner configurations vary among different models of portable computers, peripherals and even chassis of the portable computers are very different. For example, different motherboards form different sockets for electrically connecting with other electronic components, and slots providing connecting access for peripherals to the motherboards are defined in side covers of the portable computers. Because the side covers are integrally formed on enclosures of the portable computers, when two models of portable computers have different motherboards, producers must produce two different enclosures to accommodate the motherboards. This leads to increased production costs.

What is needed, therefore, is a portable computer configured for receiving interchangeable side covers.

SUMMARY OF THE INVENTION

A portable computer includes a chassis, a top panel, a motherboard, and a side cover. The chassis includes a bottom panel and a side panel. The bottom panel forms a pair of restricting tabs. The top panel covers the chassis. The top panel includes a plurality of resilient tabs. The motherboard is received in the chassis. The motherboard forms a plurality of sockets. The side cover is replaceably mounted between the chassis and the top panel, being held by the restricting tabs, the resilient tabs, and the first side panels. The side cover defines a plurality of slots for receiving the sockets of the motherboard.

Other advantages and novel features will become more apparent from the following detailed description of preferred embodiment when taken in conjunction with the accompanying drawings, in which:

DETAILED DESCRIPTION OF THE INVENTION

Figure 1:
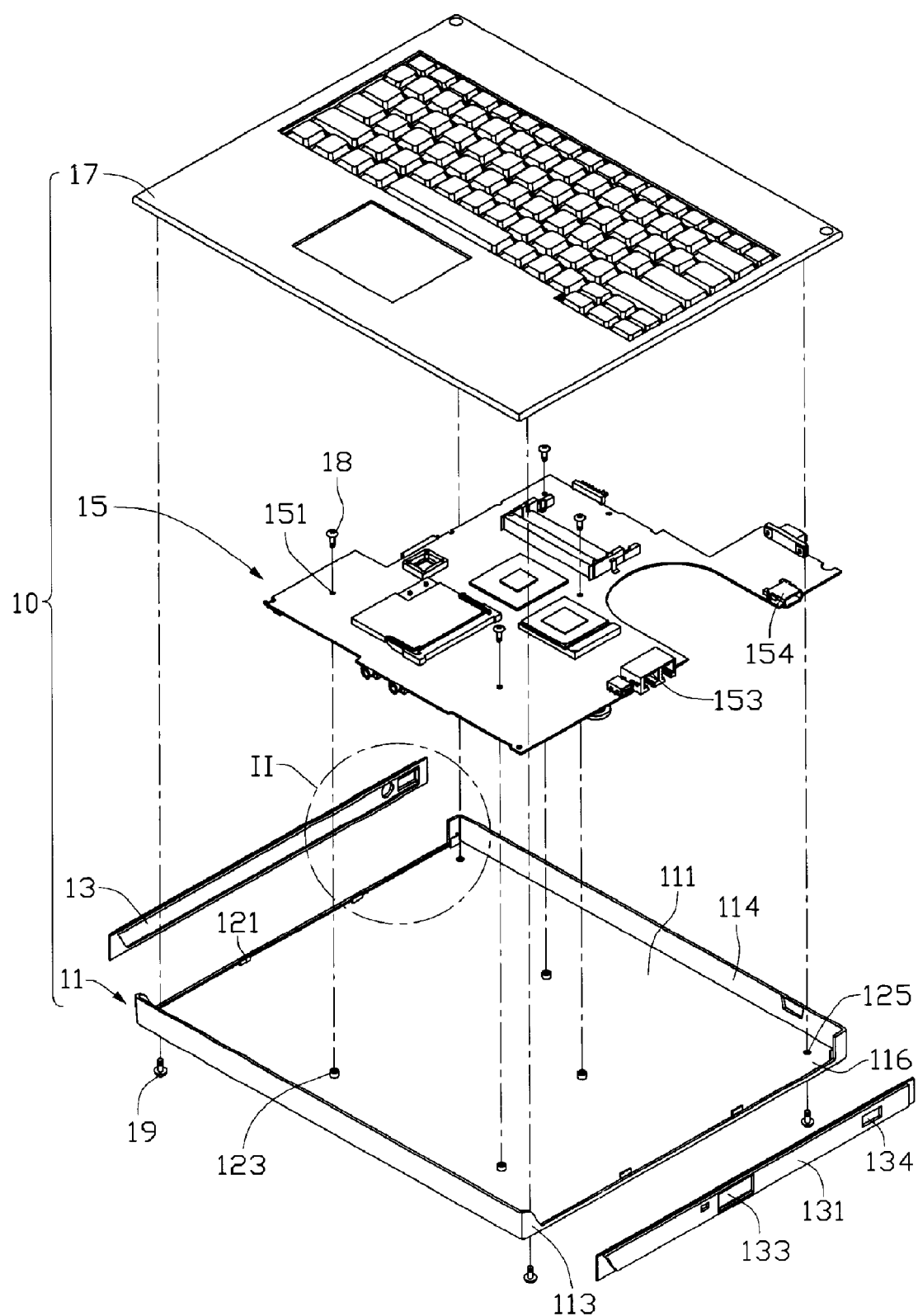
FIG. 1 is an exploded, isometric view of a base unit of a portable computer in accordance with a preferred embodiment of the present invention, the portable computer including a base unit with a top panel.
Figure 4:
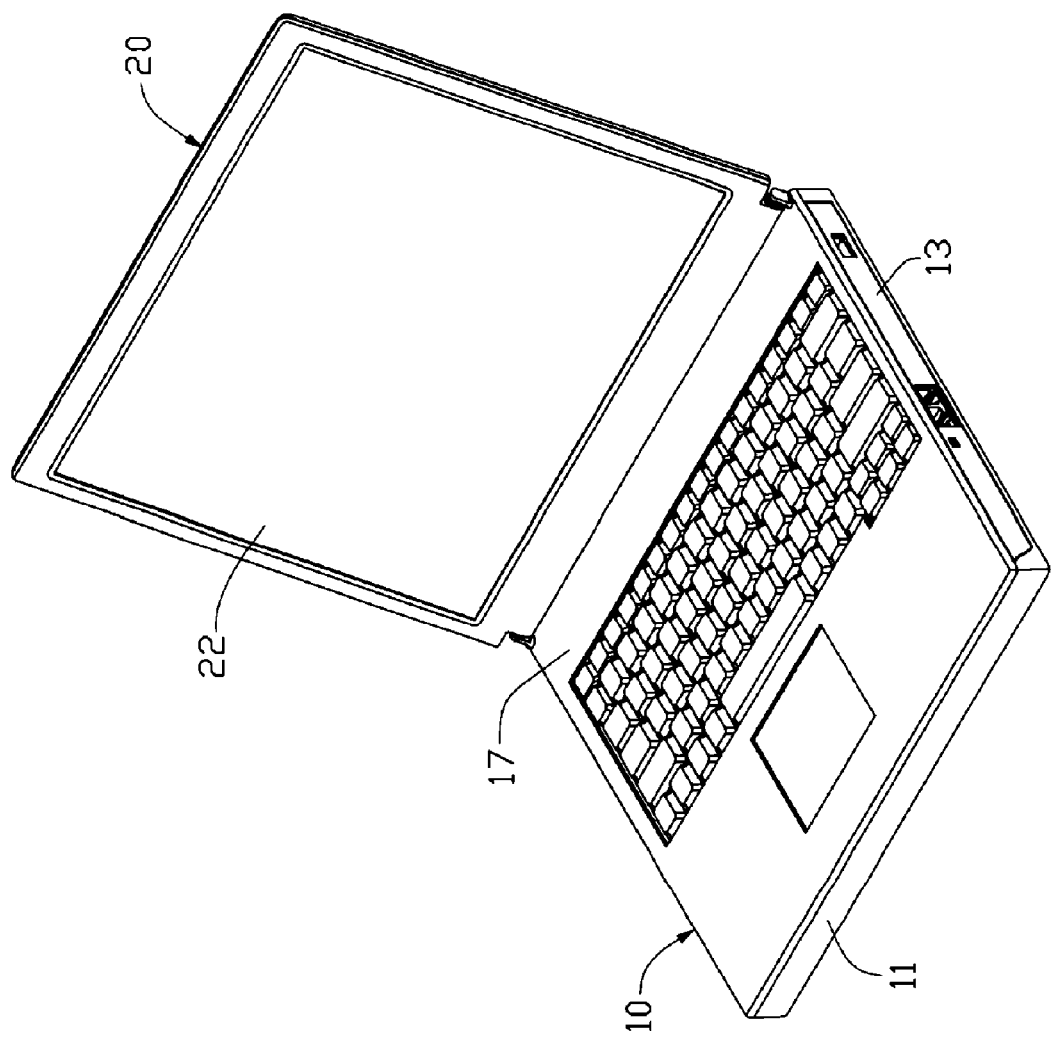
FIG. 4 is an assembled view of the portable computer.

Referring to FIGS. 1 and 4, a portable computer in accordance with a preferred embodiment of the present invention includes a base unit 10 and a cover unit 20. The base unit 10 includes a chassis 11, a pair of side covers 13, a motherboard 15, and a top panel 17.

Figure 2:
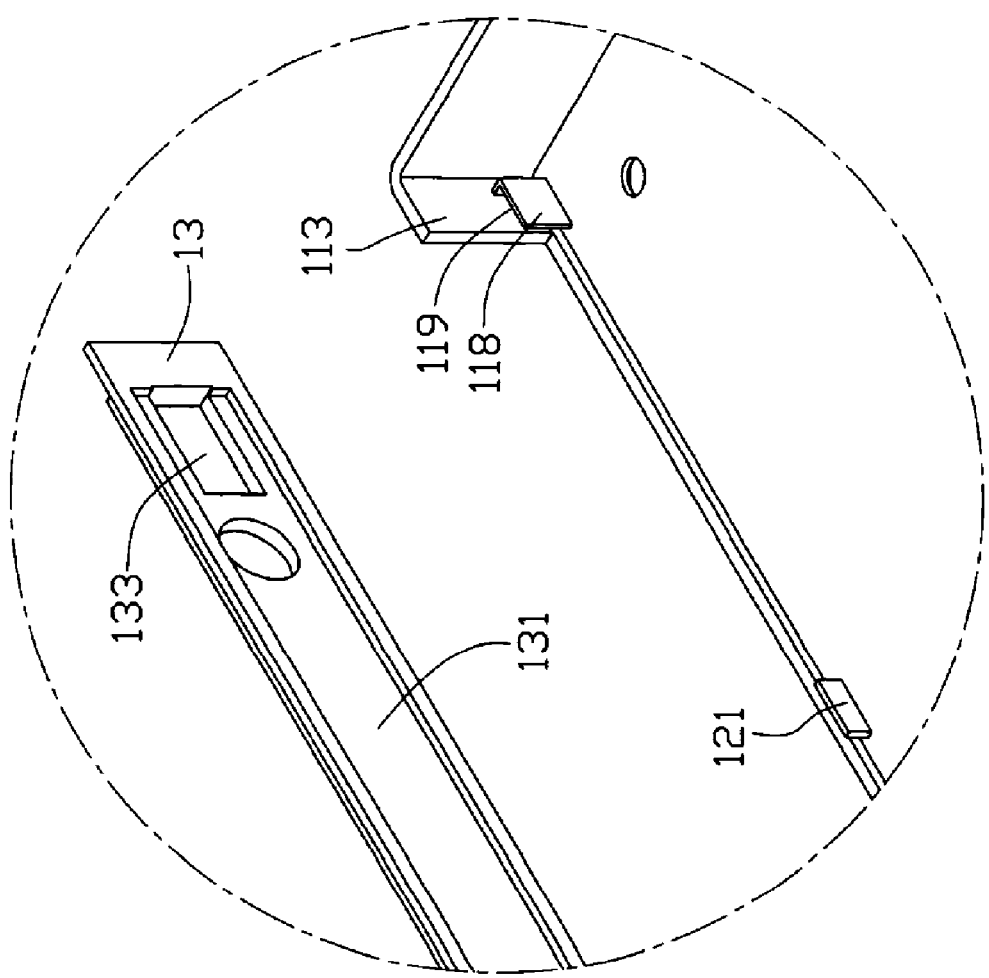
FIG. 2 is an enlarged view of circled portion II of FIG. 1.

Referring also to FIG. 2, the chassis ii includes a bottom panel 111, a pair of first side panels 113, and a pair of second side panels 114. The side panels 113, 114 extend from flanges of the bottom panel 111 in a same direction perpendicular to the bottom panel 111. The first side panels 113 are parallel with each other, and the second side panels 114 are parallel with each other. The side panels 113, 114 are connected at ends thereof with each other to form a continuous enclosure. A cutout 116 is defined in each first side panel 113 and communicates with the inside of the chassis 11. Two pairs of restricting tabs 118 and a plurality of stoppers 121 are fonned on the bottom panel 111. Each restricting tab 118 is L-shaped and adjacent to an end of a corresponding one of the cutouts 116. An end of each restricting tab 118 is bent to connect with an inner surface of its adjacent first side panel 113, and forms a receiving gap 119 between the restricting tab 118 and its adjacent first side panel 113. The stoppers 121 are parallel with the first side panels 113. and are aligned end to end with the restricting tabs 118. A plurality of protruding posts 123 is formed on an inner surface of the bottom panel 111, and a plurality of through holes 125 is defined in the bottom panel 111.

Each side cover 13 is a rectangular shaped plate and includes a protruding wall 131 offsettingly protruding outward from surrounding flanges thereof and mating with to cutout 116 of the corresponding first side panel 113. A plurality of slots 133, 134 is defined in the protruding walls 131 of the side covers 13. The slots 133, 134 provide connecting access for peripherals of the portable computer to the motherboard 15.

The motherboard 15 includes a plurality of sockets 153, 154, and the slots 133, 134 of the side covers 13 are configured to receive the sockets 153, 154 of the motherboard 15. A plurality of through holes 151 is defined in the motherboard 15 corresponding to the protruding posts 123 of the bottom panel 111, respectively.

Figure 3:
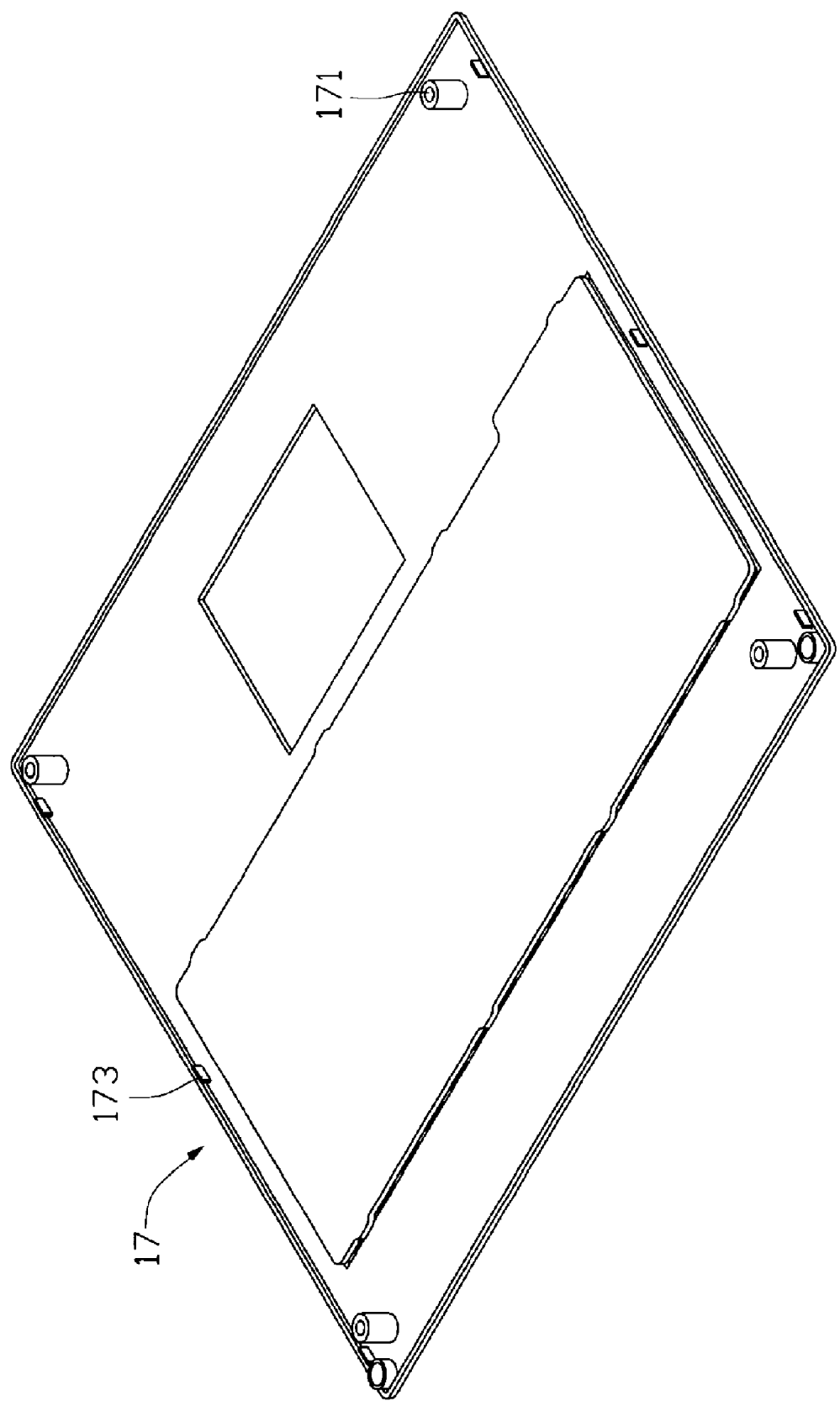
FIG. 3 is a view of the top panel from another aspect.

Referring also to FIG. 3, a plurality of positioning posts 171 protrudes from an inner surface of the top panel 17 corresponding to the through holes 125 of the bottom panel 111. A plurality of resilient tabs 173 protruded downwardly from the top panel 17, and is adjacent to flanges of the top panel 17 and parallel with the first side panels 113 of the chassis 11.

The cover unit 20 is rotatably connected with the base unit 10. The cover unit 20 includes a Liquid Crystal Display (LCD) 22, for a user to view images displayed on the LCD 22.

In assembling the portable computer, the lower flanges of the side covers 13 are received in the receiving gaps 119 between the restricting tabs 118 and its adjacent first side panels 113, the restricting tabs 118 and the stoppers 121 abutting against inner surfaces of the side covers 13. Thus the side covers 13 are restricted by the restricting tabs 118 from moving along the longitudinal directions of the first side panels 113. The protruding walls 131 mate with the cutouts 116, and outer surfaces of the protruding walls 131 are on same planes with the first side panels 113. The protruding walls 113 are exposed through the corresponding cutouts 116. Thus the side covers 13 are received within the cassis 11 adjacent to the corresponding first side panels 113, and the protruding walls 131 extend along the longitudinal directions of the corresponging first side panels 113. A plurality of screws 18 extends through the through holes 151 of the motherboard 15, and then engages with the protruding posts 123. Thus, the motherboard 15 is disposed on the bottom panel 111 of the chassis 11. A plurality of screws 19 extends through the through holes 125 of the chassis 11, and engages with the positioning posts 171 of the top panel 17. Thus, the top panel 17 is fixed to the chassis 11. At that time, the resilient tabs 173 of the top panel 17 abut against the inner surfaces of the side covers 13, and urge the side covers 13 to abut against the inner surfaces of the corresponging first side panels 113 together with the corresponding restricting tabs 118. Thus the side covers 13 are mounted between the top panel 17 and the chassis 11, being held by the restricting tabs 118, the stoppers 121, the resilient tabs 173, and the first side panels 113. The cover unit 20 is rotatably disposed on the base unit 10, and thus the portable computer is assembled.

When the motherboard 15 is replaced by another motherboard whose sockets are formed at different positions from the motherboard 15, the side covers 13 are also replaced. Therefore, the chassis 11 or the top panel 17 does not have to be replaced to accommodate changing of the motherboard 15. Comparing to the chassis 11 or the top panel 17, the cost of side covers 13 is low, and also the process of replacing the side covers 13 is simple.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

What is claimed is:

1. A portable computer, comprising:
    a chassis comprising a bottom panel and a side panel, a pair of restricting tabs arranged on the bottom panel;
    a top panel covering the chassis, the top panel comprising a plurality of resilient tabs;
    a motherboard received in the chassis, the motherboard forming a plurality of sockets; and
    a side cover replaceably mounted between the chassis and the top panel, being held by the restricting tabs, the resilient tabs and the side panel; the side cover defining a plurality of slots for receiving the sockets of the motherboard;
    wherein the side cover is received within the chassis adjacent to the side panel, the restricting tabs and the resilient tabs cooperatively urge the side cover to abut against an inner surface of the side panel, thereby fixing the side cover in the chassis.

2. The portable computer as claimed in claim 1, wherein the side panel of the chassis forms a cutout, the side cover comprises a protruding wall offsettingly protruding out from surrounding flanges thereof and mating with the cutout, thereby the protruding wall is exposed through the cutout, and the slots of the side cover are defined in the protruding wall.

3. The portable computer as claimed in claim 2, wherein each of the restricting tabs is L-shaped and adjacent to an end of the cutout, the restricting tabs abut against an inner surface of the side cover, and two opposite flanges of the side cover are received in receiving gaps between the restricting tabs and the side panel.

4. The portable computer as claimed in claim 3, wherein a plurality of stoppers is formed on the bottom panel of the chassis, the stoppers are parallel with the side panel and in an end to end alignment with the restricting tabs, the stoppers abut against the inner surface of the side cover.

5. The portable computer as claimed in claim 1, wherein the resilient tabs protrude downwardly from the top panel, and are adjacent to a flange of the top panel and parallel with the side panel of the chassis, the resilient tabs abut against an inner surface of the side cover.

6. The portable computer as claimed in claim 1, wherein a plurality of positioning posts protrudes from an inner surface of the top panel; a plurality of through holes is defined in the bottom panel; a plurality of screws extends through the through holes of the bottom panel, and then engages with the positioning posts of the top panel.

7. The portable computer as claimed in claim 1, wherein a plurality of protruding posts is formed on the bottom panel; a plurality of through holes is defined in the motherboard; a plurality of screws extends through the through holes of the motherboard, and then engages with the protruding posts.

8. A portable computer comprising:
    a base unit comprising a chassis, a pair of side covers, and a top panel, the chassis comprising a pair of side panels and a bottom panel, each of the side panels defining a cutout; communicating with the inside of the chassis; the side covers are disposed on the side panels of the chassis; a protruding wall is offsettingly protruding out from two opposite flanges of each of the side covers and mating with the corresponding cutout with an outer suface of the protruding wall being on the same plane with corresponding side panel; the top panel covering the chassis, and the side covers being mounted between the chassis and the top panel; and
    a cover unit pivotably connected with the base unit.

9. The portable computer as claimed in claim 8, wherein the bottom panel forms two pairs of restricting tabs adjacent to ends of the cutouts, the restricting tabs abut against inner surfaces of the side covers, and the opposite flanges of the side covers are received in receiving gaps between the restricting tabs and the side panels.

10. The portable computer as claimed in claim 9, wherein a plurality of stoppers is formed on the bottom panel of the chassis, the stoppers are parallel with the side panels and formed on lines defined by the restricting tabs, the stoppers abut against the inner surfaces of the side covers.

11. The portable computer as claimed in claim 8, wherein a plurality of resilient tabs protrude downwardly from the top panel, are adjacent to flanges of the top panel, and parallel with the side panels of the chassis; the resilient tabs abut against inner surfaces of the side covers.

12. The portable computer as claimed in claim 8, wherein a motherboard is mounted in the base unit, the motherboard forms a plurality of sockets, and at least one of the side covers comprises a plurality of slots configured for receiving the sockets of the motherboard.

13. The portable computer as claimed in claim 8, wherein a plurality of positioning posts protrudes from an inner surface of the top panel; a plurality of through holes is defined in the bottom panel; a plurality of screws extends through the through holes of the bottom panel, and engages with the positioning posts of the top panel.

14. A portable computer, comprising:
    a chassis comprising a bottom panel and a side panel extending from the bottom panel;
    a top panel covering the chassis;
    a motherboard received in the chassis, the motherboard forming a plurality of sockets; and
    a side cover replaceably mounted between the chassis and the top panel, the side cover defining a plurality of slots configured for receiving the sockets of the motherboard;
    wherein a cutout is defined in the side panel; two restricting tabs are bent from the side panel adjacent to two ends of the cutout and extend toward the cutout in two opposite directions, thereby forming two receiving gaps between the restricting tabs and the side panel; two opposite flanges of the side cover are received in the receiving gaps and are restricted by the restricting tabs from moving along the longitudinal direction of the side panel.

15. The portable computer as claimed in claim 14, wherein a plurality of stoppers is formed on the bottom panel of the chassis, the stoppers are parallel with the side panel and formed on a line defined by the restricting tabs, the stoppers abut against an inner surface of the side cover.

16. The portable computer as claimed in claim 15, wherein a plurality of resilient tabs protrude from the top panel and are parallel with the side panel of the chassis, the resilient tabs abut against the inner surface of the side cover to urge the side cover to abut against the side panel together with the stoppers.

17. The portable computer as claimed in claim 14, wherein a protruding wall offsettingly protrudes out from surrounding flanges of the side cover and engages in the cutout of the side panel with an outer surface of the protruding wall being on the same plane with the side panel, thereby being exposed through the cutout.

* * * * *